US005466502A

United States Patent [19]

Wilkinson et al.

[11] Patent Number: 5,466,502

[45] Date of Patent: Nov. 14, 1995

[54] DUAL-PLY RESPOSITIONAL WINDOW PRICING LABEL HAVING SEPARABLE RECORD SHEET

[75] Inventors: Stephen C. Wilkinson, Jefferson City, Mo.; Randy A. Thorman, Omaha, Nebr.

[73] Assignee: Moore Business Forms, Inc., Grand Island, N.Y.

[21] Appl. No.: 358,589

[22] Filed: Dec. 13, 1994

Related U.S. Application Data

[63] Continuation of Ser. No. 174,348, Dec. 28, 1993, abandoned.

[51] Int. Cl.[6] .......... B32B 9/00

[52] U.S. Cl. .......... 428/40; 428/43; 428/48; 428/194; 428/195; 428/202; 428/204; 428/207; 428/343; 428/354; 283/81; 283/98; 283/100; 283/101; 283/108

[58] Field of Search .......... 428/40, 41, 43, 428/195, 207, 914, 352, 194, 137, 202, 204, 354; 283/81, 98, 100, 101, 108

[56] References Cited

U.S. PATENT DOCUMENTS

| | | | |
|---|---|---|---|
| 2,110,768 | 3/1938 | Kellogg | 40/10 |
| 2,603,899 | 7/1952 | Leander | 40/125 |
| 3,799,829 | 3/1974 | Heatwole | 156/235 |
| 4,068,028 | 1/1978 | Samonides | 428/40 |
| 4,671,003 | 6/1987 | Vitol | 428/191 |
| 4,695,077 | 9/1987 | Pretre | 283/81 |
| 4,864,755 | 9/1989 | Owens | 40/594 |
| 4,882,211 | 11/1989 | McIntyre et al. | 428/40 |
| 4,889,754 | 12/1989 | Vargas | 428/41 |
| 4,895,747 | 1/1990 | Birkholz et al. | 428/42 |
| 4,940,258 | 7/1990 | Cuba, Jr. et al. | 283/81 |
| 5,090,942 | 2/1992 | Traise | 462/66 |
| 5,201,133 | 4/1993 | Best et al. | 40/158.1 |
| 5,290,067 | 3/1994 | Langen | 283/60.1 |
| 5,318,325 | 6/1994 | Ispen | 283/81 |

*Primary Examiner*—Patrick J. Ryan
*Assistant Examiner*—Abraham Bahta
*Attorney, Agent, or Firm*—Nixon & Vanderhye

[57] ABSTRACT

A window sticker for pricing and fuel economy information about a motor vehicle can be readily positioned and repositioned on a motor vehicle window, and finally removed from the window without leaving an adhesive residue, and in integral form so that it serves as a customer receipt. A continuous web of bond paper with an adhesive-coated backing is moved in a first direction to a press where fixed indicia, including fuel economy and price related word indicia, is applied to a first face of the front web sheet. A record sheet web is applied to the dual ply-web of bond paper and backing. The front web sheet has a release coating on a second face that releasably adheres to the backing sheet. The front web sheet also includes a removable boarder surrounding the window sticker. Removal of this border exposes a corresponding border section of the adhesive coated backing which secures the window sticker to a vehicle window. The backing may be die cut to form a center sticker section that remains attached to the window sticker to form a single document with printed indicia on front and back faces.

13 Claims, 3 Drawing Sheets

DUAL-PLY RESPOSITIONAL WINDOW PRICING LABEL HAVING SEPARABLE RECORD SHEET

This is a continuation of application Ser. No. 08/174,348, filed Dec. 28, 1993, now abandoned.

RELATED APPLICATIONS

This application is related to commonly assigned U.S. patent applications Ser. No. 07/820,375, filed Jan. 14, 1992, now U.S. Pat. No. 5,290,067 and Ser. No. 08/138,266, filed Oct. 20, 1993.

BACKGROUND AND SUMMARY OF THE INVENTION

The invention relates to window stickers for selling motor vehicles. One form of window sticker common in today's market is a sticker having a bond sheet with a water reactive starch based adhesive coating covering the entire sheet. The adhesive is wetted, and applied to a motor vehicle window. While this type of sticker is economical, it must be scraped from the window at the time of auto purchase, leaving adhesive residue on the window's surface, and completely destroying the label.

Another type of commonly used window sticker comprises a bond face sheet fully coated with a pressure sensitive removable adhesive adhered to a printed release liner, the printed release liner containing the necessary pricing and fuel economy information. By removing the border of the release liner, the label is affixed to the inside of a car window. This construction allows the dealer to remove the entire label, and separate the two plies, so that the customer may retain the printed release sheet for future reference. However, this type of form is expensive, leaves an adhesive residue on the window surface, yellows at the exposed adhesive areas, delaminates from the window at high temperatures, and is easily ripped or removed from the window when the window is rolled open.

The present invention in one embodiment includes a window sticker with a removable border, a window sticker backing with an adhesive coating, and a separable record sheet. This invention overcomes the disadvantages discussed above, and additionally allows easy production of the window sticker utilizing continuous or sheet fed laser printers. According to the present invention, a sticker is provided that may be constructed simply and relatively inexpensively from bond paper, cleanly removed from a window with no adhesive residue remaining on the window or sticker, removed integrally so that the sticker may be retained by the customer as a receipt and a separate record sheet may be retained by the car dealer.

According to one aspect of the present invention, a window sticker composition is provided which comprises the following elements: A front sheet of opaque material having first and second faces. The front sheet includes a center window sticker surrounded by a removable border section. Indicia is printed on the first face of the center window sticker. Attached to the second face of the front sheet is a backing sheet having first and second faces wherein the first face is coated with a repositional adhesive. This repositional adhesive of the backing releasably adheres to a release coating on the second face of the front sheet. A center section of the second face of the backing sheet also may have printed indicia. A recording sheet is attached to the second face of the backing sheet.

The first face of the front sheet and possibly the second face of the backing sheet preferably comprises a bond paper sheet, and the indicia includes fixed word indicia relating to fuel economy, price and warranty information for a motor vehicle, and also includes variable numerical indicia corresponding to and adjacent the fuel economy, price and warranty word indicia. The recording sheet may contain identical printed indicia and carbonless contact ink for recording additional information imprinted onto the front sheet, such information regarding the actual sale of the vehicle.

The window sticker composition may be formed in a continuous dual-ply web of opaque material (e.g. bond paper) with a backing both elongated in a first direction, with a record sheet web attached to the backing. The recording sheet may be attached with a glue strip to the dual-ply web of the front and backing sheets. Means defining lines of weakness (e.g. perforations) are provided in a second direction, perpendicular to the first direction, to separate the webs into individual sheet sticker compositions, with means defining tractor drive openings in the web adjacent first and second opposite edges extending in the first direction.

In use of the window stickers, the border of the front sheet is peeled from the backing to expose a border section of repositional adhesive on the backing sheet surrounding, at least partially, the center window sticker of the front sheet. The exposed repositional adhesive of a border section of the backing is brought into contact with the inside surface of a motor vehicle window to hold the window sticker in place. The backing and window sticker may be removed from the window and repositioned as desired. Once the motor vehicle is sold, the entire window sticker and backing is removed from the motor vehicle, leaving no adhesive residue on the window. Additional information may be added to the front sheet such as a signature, and that information copied on the recording sheet attached to the backing. The backing may then be peeled from the window sticker which may be maintained by a customer as a receipt and the backing is discarded. Alternatively, a backing border may be removed while a backing center section with indicia remains permanently adhered to the window sticker. In addition, the recording sheet may be peeled from the backing and retained by the auto dealer.

It is the primary object of the present invention to provide a versatile, simple, economical, and advantageous window sticker and recording sheet pricing and fuel economy information. This and other objects of the invention will become clear from an inspection of the detailed description of invention, and from the appended claims.

DETAILED DESCRIPTION OF THE DRAWINGS

Figure 1:
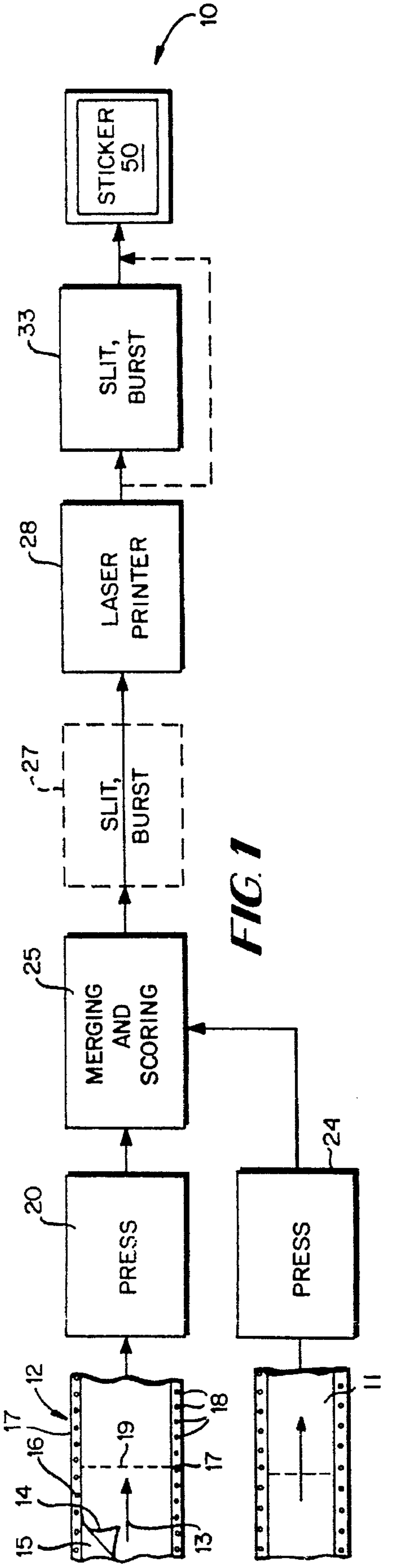
FIG. 1 is a flow chart showing an exemplary method to form a window sticker composition according to the present invention.

FIG. 1 illustrates schematically exemplary method steps and equipment utilized in the practice of an exemplary method according to the present invention. According to the method of the present invention, a multiply window sticker composition—shown schematically by reference numeral 10—is produced from a continuous dual-ply web 12. The web may include a first (front) ply 14 formed of an opaque material, typically bond paper and a secondary (back) ply 15 (FIG. 2) formed of a backing material coated with a repositional adhesive. A recording sheet web 11 coated with carbonless contact ink may be attached to the dual-ply web 12. As an alternative to a continuous web, the window sticker 10 may be formed from a stack of individual multi-ply web sheets.

The web 12 is elongated in a first direction 13. The front ply 14 includes a first (top) face 16 and a bottom face. Typically, each ply-sheet of web 12 also includes longitudinal edges 17 parallel to the first direction 13, and trim strips defining tractor feed openings 18 adjacent each of the edges 17, in marginal portions of web 12. The trim strips are separable from the web via lines of weakness between each strip and the web. Alternatively, the trim strips with tractor feed holes 18 may be included on just one sheet, such as backing ply 15 of web 12. Transverse lines of weakness 19, such as perforations, are provided at spaced locations across the web 12 perpendicular to the first direction 13. These lines 19 divide the web 12 into individual sheets each used to form a window sticker composition 10 useful in making a final window sticker 50.

An exemplary method according to the present invention is described that is applicable to both continuous webs and individual sheets, but described in connection with a continuous web. The plys 14 and 15 of web 12 may or may not be pre-printed with automotive related indicia prior to being brought together as a single dual-ply web. For example, generic auto sales information, such as warranties and notice information, may be pre-printed on the first (top) face 16 of the front ply and other such information printed on the second face of the backing sheet 15, before the dual-ply web is formed.

The dual-ply web 12 is fed in the first direction 13 by any conventional apparatus, such as feed rollers or sheet feeder (not shown), to a conventional printing press 20 or the like. At the press 20, fixed word indicia (FIGS. 2 and 4) is printed on the first face 16 of the front sheet 14 of web 12, and (if desired) on the second face 75 (FIG. 4) of the backing sheet 15.

Figure 2:
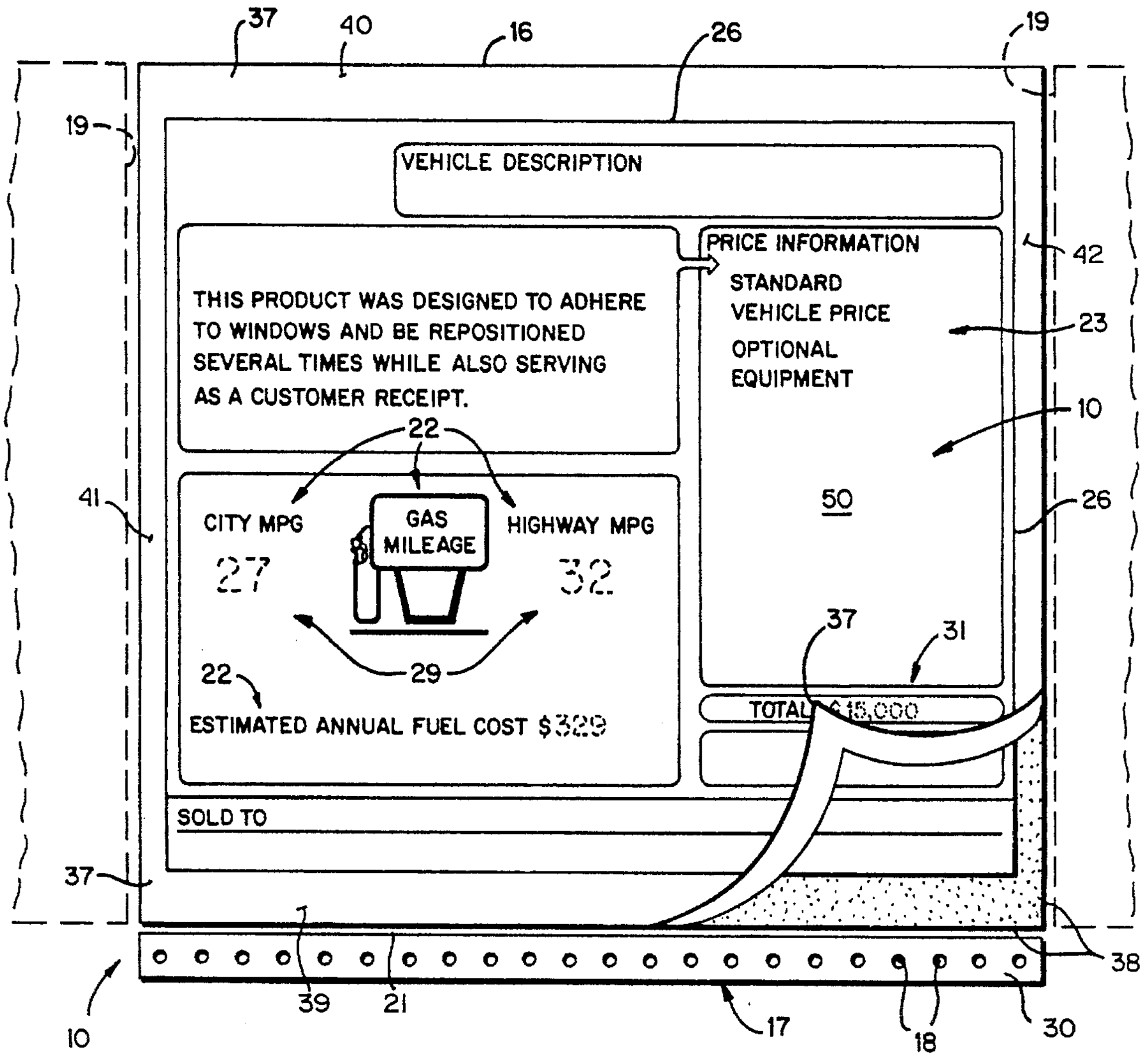
FIG. 2 is a top plan view of an exemplary window sticker composition according to a first embodiment of the invention.

The fixed word indicia includes indicia—shown at 22 in FIG. 2— which relates to fuel economy of a type of motor vehicle. The indicia may be printed with fade-resistant inks, such as "Reflex Blue", "278 Blue" and "290 Blue" available from Water Ink Technology of Iron Station, N.C. The fixed indicia may also include word price indicia 23 (see FIG. 2) relating to that motor vehicle. The indicia 22, 23 will be of the type required by federal, state or local law, in conventional practice, such as listing the city and highway estimated fuel economy of the vehicle, the estimated annual fuel cost for comparison purposes, a list of options and the prices of options, and a space for the total price in dollars. The top face 16 of the front sheet 14 may be coated with a varnish 36 (FIG. 3), such as "1829 Varnish" available from Water Ink Technology.

After printing of the fixed indicia 22, 23 on the web 12 by the press 20, the web 12 is fed to a merging/scoring station 25 where the front sheet 14 (and the backing 15 in a second embodiment) is die cut along the edges 26 (FIG. 2) of the printed window sticker 50. In addition, a web of record sheets 11 is moved in a longitudinal direction through press 24 which imprints fixed word indicia on one or both sides of each record sheet. The web of record sheets 11 is glued via a glue strip to the back face of the backing ply 15 at the merging/scoring station.

The removable border 37 of the front sheet is the portion of the sheet outside of the edges 26 of the window sticker composition 12. The border may completely surround the window sticker, as shown in FIG. 2, or the border may be a pair of marginal strips parallel and adjacent to the trim strips on the front and/or back sheets of web 12.

The backing sheet 15 is not scored in a first embodiment, but is in a second embodiment described below. The backing web with its repositional adhesive holds the front sheet, including window sticker and border 37, together until the border is peeled away to expose a corresponding adhesive backing border section 38. The window sticker with exposed backing border is pressed against and adheres to a vehicle window. A first 39 and second 40 opposite edge sections of the border may be wider than a third 41 and fourth opposite 42 edge sections of the border. The wider edge border sections have a relatively large area of adhesive exposed when the front sheet border 37 is peeled to expose the backing border section. The large opposing adhesive areas enhance the ability of the window sticker to adhere to a window.

The repositional adhesive on the backing web is of the type such as described in commonly-assigned U.S. Pat. No. 4,882,211, the disclosure of which is hereby incorporated by reference herein. The adhesive may be that manufactured by 3M for use with its Post-It® products, or that manufactured by Moore Business Forms, Inc. for its Note-Stix® and Clean Tac® products, or other suitable repositional adhesives.

After passing through merging/scoring station 25, the web 12 and attached record sheet web 11 may optionally be slit and burst at that point, as illustrated in dotted line by slit/burst station 27. If slit and burst at this station 27, utilizing a conventional slitter for removing the marginal portions 30 of the web 12 along the edges 17 containing the tractor drive openings 18 and a conventional burster for bursting along the perforations 19, the window sticker composition forms will be fed to a sheet teed laser printer 28. If not burst at station 27, they will be fed to a continuous laser printer 28, such as Siemens ND2200 Cold Fusion Printer.

Normally the laser printer 28 is located at a different location than the press 20, and merging/scoring station 25 although the printers may be at the same location. Whether the forms are fed in continuous format or sheet fed format to the laser printer 28, the printer prints variable indicia on the top face of the front sheet 16 including numerical indicia, such as indicia 29 illustrated in FIG. 2, corresponding to the fixed information fuel economy words, and variable numerical indicia 31 corresponding to the fixed indicia words regarding price. If printed in continuous format by the laser printer 28, the web 12 is then slit and burst at station 32, again utilizing a conventional slitter for slitting off the marginal trim strips 30 containing the tractor drive openings 18, and bursting the individual window stickers from each other along the perforations 19. The final product is a window sticker composite 10 that is illustrated in FIG. 2.

Figure 3:
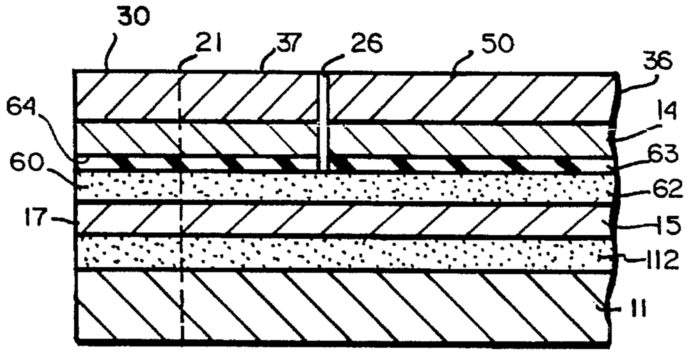
FIG. 3 is a detail cross-sectional view of an edge of the window sticker composition shown in FIG. 2.

FIG. 3 illustrates an edge configuration (adjacent an edge 17) of the first embodiment of the multi-ply web 12 shown in FIG. 2. Applied onto the first (top) surface 60 of the back sheet 15 is a coating of repositional adhesive 62 which is adhesively secured to a release coating 63 of a second face 64 of the front sheet 14. The adhesive on the backing 15 adheres to both the second face of the window sticker 50 and border 37, which are separated by a scored boundary 26. The backing web may or may not extend below the trim strips 30 of the front sheet that are separable from the front sheet along a line of weakness 21. Alternatively, the backing web may include the trim strips instead of the front web sheet.

Figure 4:
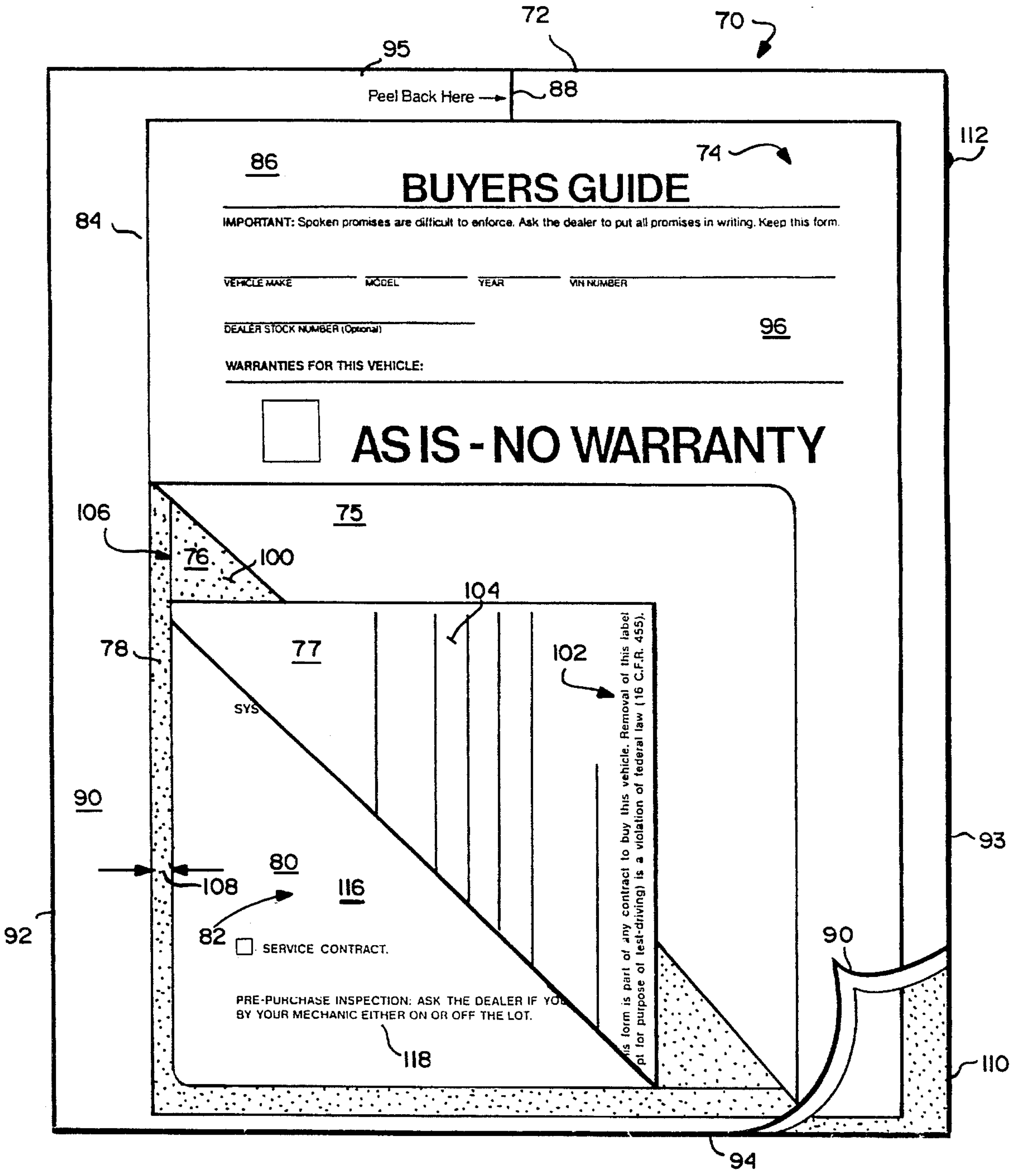
FIG. 4 is a top plan view of a second embodiment of a window sticker composition according to the invention.

FIG. 4 shows a second embodiment of a window sticker composite 70 according to the present invention, illustrating a triple-ply web 72. The web comprises a front sheet 74, a backing sheet 76 coated with repositional adhesive 78, and a record sheet 80 coated with a carbonless ink 82. In this embodiment, there is no trim strip, but such strip may be used if the sticker is to be formed from continuous webs. The repositional adhesive 78 is disposed on the backing sheet 76 that backs the entirety of the front sheet 74.

The back face (second face) 75 of the front sheet is shown as a partially-folded section of the front sheet. Similarly, the back face (second face) 77 of the backing sheet 76 is also shown in a partially folded form. The folded sheets shown in FIG. 4 are for purposes of illustration. In normal operation, the window sticker composite would not be folded as shown in FIG. 4.

The front sheet 74 is scored, such as by die cutting, along the border perimeter line 84 of the center window sticker 86 of the front sheet 74. In addition, the front sheet may be scored along a peel line 88 to aid in removal of the border 90 of the front sheet. Removal of the border 87 exposes the repositional adhesive 78 on the underlying backing sheet 76. The border of the front sheet may be wider along a pair of opposing edges 92, 93 than along the remaining opposing edges 94, 95. The wide border, when removed, exposes a wide section of repositional adhesive to enhance the bonding between the window sticker adhesive and a window.

The first (top) face 96 of the front sheet 74 bears printed indicia on the center window sticker section 86. This indicia may be similar to the printed indicia described in connection with the first described embodiment of the invention, or it may be other indicia such as for the sale of a used vehicle as partially shown in FIG. 4. The second face 75 of the front sheet 74 may be coated with a release coating, similar to that shown in FIG. 3. The repositional adhesive 78 of the backing sheet 76 releasably adheres to the release coating of the second face 75 of the front sheet 74.

The backing sheet 76 has a first (top) face 100 completely coated with a repositional adhesive 78. The second face 77 of the backing sheet may bear printed indicia 102, such as the dealer name and address, and identifying defects that may occur in used motor vehicles. The printed indicia 102 on the second face 77 of the backing sheet may be confined to a center section 104 smaller than the center window sticker 86 of the front sheet 74. The center section 104 of the backing sheet is intended to remain attached to the center window sticker 86 after the vehicle is sold. For example, the window sticker 86 and attached center backing section 104 are presented to the vehicle purchaser as a single document at the time of sale of the vehicle.

The center backing section 104 is removable from the remainder of backing sheet 76 due to a score line 106 or line of weakness extending along the perimeter of the center backing section 104. Because the center backing section has a smaller area than the center window sticker 86, there is a backing border strip 108 of repositional adhesive outside of the center backing section that adheres to the second face 75 of the front sheet 72. The border strip holds the center window sticker and indirectly the center backing section 104 to the adhesive coated outer border 110 underlying the removable border 90 of the front sheet. The outer border 110 is removed from the window and center window sticker and center backing section when the vehicle is sold.

The record sheet 80 may be attached to the second face 77 of the backing sheet with at least one glue strip 112 parallel to, for example, edge 95 of the window sticker composite. The record sheet can be peeled off or torn from the backing, at the time of the vehicle sale to provide a record of the sale for the dealer. The record sheet may include lines of weakness so that the trim strips can be discarded from the information bearing center section 116 of the record sheet. The information on the front and back faces of the record sheet may be identical to the information indicia on the center window sticker and center backing section, respectively. The record sheet may include pre-printed information 118 imprinted before the record sheet is attached to the web of the front and backing plys. In addition, information may also be transferred to the record sheet via carbonless contact ink when information is imprinted on the center window sticker.

Figure 5:
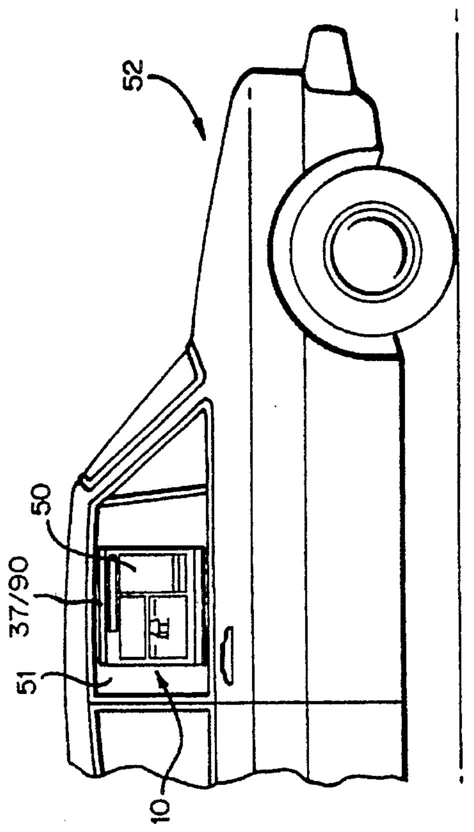
FIG. 5 is a schematic side view showing a sticker according to the invention in use on a motor vehicle window.

FIG. 5 illustrates a manner of use of the window sticker 50 according to the invention. Utilization of the window sticker is simple. All one does is remove the border (37 or 90) from the adhesive coated backing. By removing the border, the adhesive coated backing 15, 78 underneath the border is exposed. The window sticker with exposed backing is placed into contact with the interior surface of a window 51 of a motor vehicle, such as automobile 52. The sticker 50 may be removed from the window 51 and repositioned as desired, the repositional adhesive on the back allows for this. Once the motor vehicle 52 is sold, the sticker 50 is removed from the vehicle and the backing peeled from the window decal. Since the decal is entirely integral and in readable form, it may be maintained by the customer as a receipt. When the sticker 10 is removed from the window 51, no adhesive residue remains. In addition, the record sheet may be peeled from the backing and retained by the auto dealer.

It will thus be seen that according to the present invention an advantageous window sticker, particularly for use with a motor vehicle, has been provided which is simple and inexpensive to construct and simple to utilize. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and procedures.

What is claimed is:

1. A window sticker composite comprising:

a front sheet having first and second faces, said front sheet having a front window sticker at least partially surrounded by a front border, indicia printed on said front window sticker of the first face of the front sheet;

a backing sheet underneath said front sheet, said backing sheet having a first face coated with a repositional adhesive adhering to said second face of said front sheet and the backing sheet being segregated into a back window sticker separable from a surronding back border, wherein the front window sticker is superimposed over the back window sticker and an inner rim of the back border and wherein said front border being removable to expose a portion of the corresponding adhesive coated back border.

2. A window sticker composite as recited in claim 1 wherein said indicia printed on said front window sticker includes fixed word indicia relating to fuel economy of a motor vehicle, and price information for that motor vehicle.

3. A window sticker composite as recited in claim 2 wherein said indicia printed on said front window sticker further includes variable indicia providing numerical indicia corresponding to and adjacent the fuel economy and price word indicia.

4. A window sticker composite as recited in claim 1 wherein said said back window sticker has a second face bearing printed indicia.

5. A window sticker composite as recited in claim 4 further comprising a record sheet of opaque material releasably attached to a second face of said backing sheet, said record sheet bearing printed indicia on a first face.

6. A window sticker composite as recited in claim 1 wherein said front sheet comprises bond paper and said first face is at least partially coated with a varnish.

7. A window sticker composite as recited in claim 5 wherein said record sheet bears on a first face printed indicia substantially identical to said indicia on said front window sticker.

8. A window sticker composite as recited in claim 7 wherein said record sheet further comprises a second face that bears printed indicia substantially identical to printed indicia on said second face of the back window sticker.

9. A window sticker composite as recited in claim 7 wherein said record sheet is at least partially coated with carbonless copy ink.

10. A window sticker composite as recited in claim 1 wherein said back border comprises a continuous frame around said back window sticker and is substantially larger in area than is the front border.

11. A window sticker composite as recited in claim 1 further comprising marginal trim strips separated from said front sheet or said backing sheet by a lines of weaknesses adjacent a pair of opposite edges of either of said sheets.

12. A form assembly comprising:

a front web having first and second faces, the front web having a front window sticker section and a front border section adjacent the periphery of the front window sticker section, a die cut separating the front window sticker section from the front border section, and indicia printed on the first face of the front window sticker section;

a backing web underneath the front web having a first face coated with a repositional adhesive, the adhesive adhering to the second face of the front web, the backing web having a back window sticker section separated by a die cut from a back window sticker section, the back window sticker section being substantially smaller in area than the front window sticker section, the back window sticker section adhering to the front window sticker section, the back border section adhering to both the front border section and the front window sticker, wherein the front boarder section being removable to expose a portion of the adhesive coated back border section.

13. A window sticker composite comprising:

a front sheet having first and second faces, said second face having a release coating, said front sheet having a front window sticker at least partially surrounded by a front border, and a score line at an outer periphery of the front window sticker separating the sticker from the front border, indicia printed on said front window sticker of the first face of the front sheet;

a backing sheet underneath said front sheet, said backing sheet having a first face coated with a repositional adhesive adhering to the release coating of said second face of said front sheet and the backing sheet being segregated into a back window sticker separable from a surrounding back border, wherein the front window sticker is superimposed over the back window sticker and an inner rim of the back border and wherein said front border being removable from the front window sticker along the score line to expose a portion of the corresponding adhesive coated back border.

* * * * *